United States Patent [19]
Yonemitsu et al.

[11] Patent Number: 5,903,705
[45] Date of Patent: May 11, 1999

[54] MEDIA AND PLAYER USING TERRITORY CODE

[75] Inventors: Jun Yonemitsu; Yoshinari Chida, both of Kanagawa, Japan

[73] Assignee: Sony Corporation, Tokyo, Japan

[21] Appl. No.: 08/806,287

[22] Filed: Feb. 25, 1997

[30] Foreign Application Priority Data

Feb. 22, 1996 [JP] Japan .................................. 8-034807

[51] Int. Cl.$^6$ ...................................................... H04N 5/76
[52] U.S. Cl. ............................................. 386/95; 386/94
[58] Field of Search .................................. 386/46, 94, 95, 386/111, 124, 83, 125, 98; 360/60; 380/4, 5; H04N 5/76

[56] References Cited

U.S. PATENT DOCUMENTS

| | | | |
|---|---|---|---|
| 5,084,790 | 1/1992 | Endoh | 360/60 |
| 5,453,793 | 9/1995 | Kim | 386/83 |
| 5,526,130 | 7/1996 | Kim | 386/83 |
| 5,598,276 | 1/1997 | Cookson et al. | 386/46 |

*Primary Examiner*—Huy T Nguyen
*Attorney, Agent, or Firm*—Frommer, Lawrence & Haug, LLP.; William S. Frommer

[57] ABSTRACT

A recording medium and a picture display system in which multiplexed data recorded on a recording medium sold only in a specified territory or multiplexed data broadcast for a specified territory can be displayed only on a decoding reproducing system sold or installed only in such territory. Multiplexed data including a territory code are recorded on a recording medium. This territory code is compared to the inner territory code in the decoding device and, if the territory code of the recording medium includes the inner territory code of the decoding unit, the recording medium is decoded and reproduced. In the multiplexed data, allowable period data is stated in association with the territory code. This allowed period is compared to the date of a calendar generator in the decoding unit. If the date of the calendar generator is comprised within the allowed period, the recording medium is decoded and reproduced.

5 Claims, 5 Drawing Sheets

**FIG.1
(FRIOR ART)**

MEDIA AND PLAYER USING TERRITORY CODE

BACKGROUND OF THE INVENTION

1. Field of the Invention

This invention relates to a recording medium, such as a video tape or a video disc, on which are recorded encoded moving picture signals. The present invention also relates to a picture display system for decoding and reproducing a recording medium having recorded thereon these encoded moving picture signals.

2. Description of the Related Art

Figure 1:
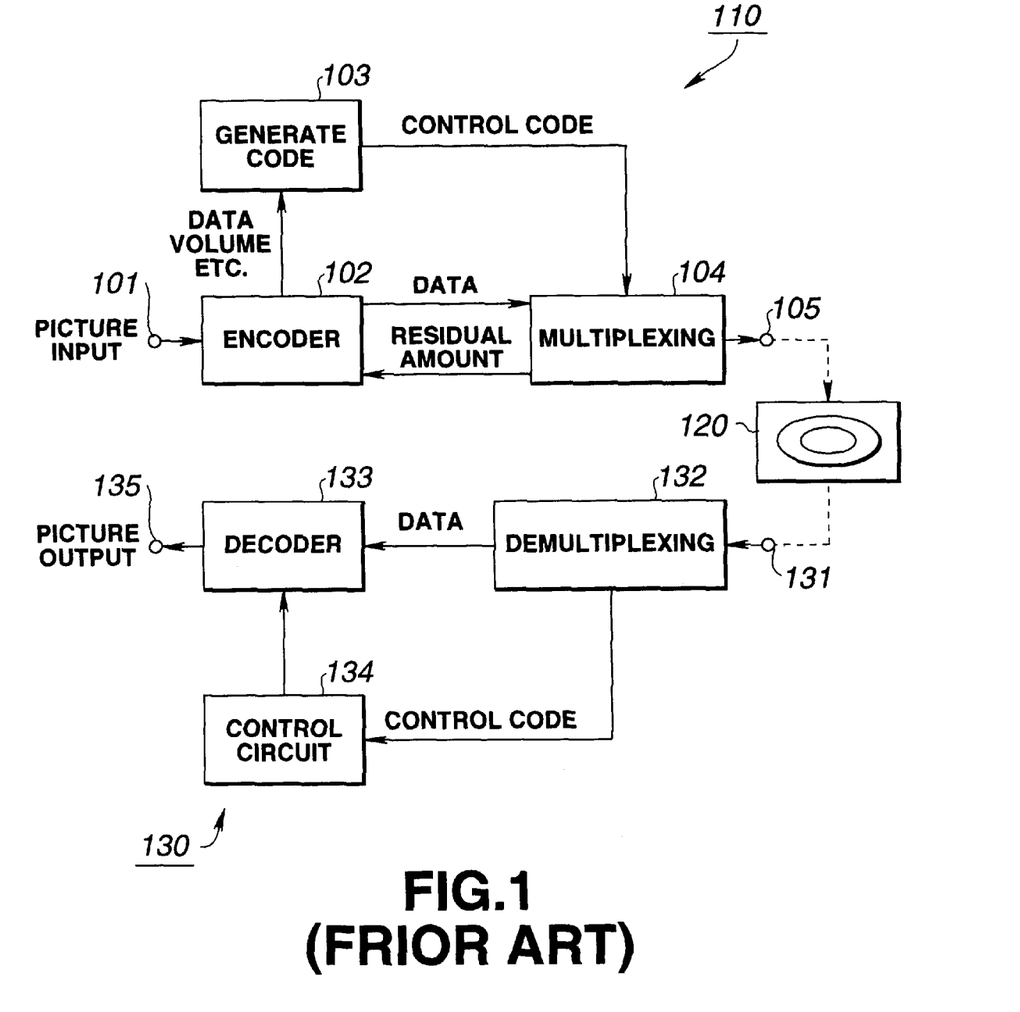
FIG. 1 is a block circuit diagram showing an illustrative structure of a conventional picture encoding/decoding system.

FIG. 1 shows the structure of a conventional picture display system, that is an illustrative structure of an encoding/decoding system having an encoding unit 110 for encoding moving picture signals in general, and a decoding unit 130 for decoding the data encoded by the encoding unit 110.

To an input terminal 101 of the encoding unit 110 are supplied signals of a continuous picture (time-domain moving pictures). These input picture signals are first encoded by an encoder 102 and thence supplied as encoded data to a multiplexer 104.

The encoder 102 takes a frame-to-frame difference or executes discrete cosine transform (DCT) for eliminating redundant portions of the original pictures (input picture signals) on both the time axis and on the frequency axis, and encodes the resulting signal.

The encoder 102 executes the encoding in accordance with the so-called MPEG (Moving Picture Experts Group)-½ video standard, as an example of the encoding. Thus, a unit of the data sequentially outputted by the encoder 102 (encoded data), or unit data, corresponds to the signal of a sole original picture (one-frame or one-field signals) encoded in accordance with the MPEG standard, or a set of encoded moving picture signals under the MPEG standard, or a group-of-pictures (GOP). How the unit data is processed is determined depending on the capacity of a buffer memory, not shown, provided in a multiplexer 104 as later explained and on the data volume of the encoded data.

The encoder 102 also outputs the information specifying the data volume of the output encoded data and the other information which are sent to a control code generator 103.

The control code generator 103 generates various control codes pertinent to the encoded data, based on the encoded data, and sends the generated control codes to the multiplexer 104. If the encoder 102 is constructed in accordance with the MPEG standard, the control codes denote the information such as various headers and time stamps.

The multiplexer 104 multiplexes the encoded data from the encoder 102 and the control codes for the control code generator 103 to output the resulting multiplexed data. The multiplexer 104 also maintains continuity of the output data. That is, the upstream side encoder 102 eliminates the redundant portions of the input picture signal on both the time axis and the frequency axis, as described above, so that the input picture signal portion high in redundancy is compressed, while the input picture signal portion low in redundancy is not compressed sufficiently. The result is that continuity is not assured for the encoded data outputted by the encoder 102. Thus the multiplexer 104 causes the output encoded data of the encoder 102 to be temporarily stored in a buffer memory in order to output the data which becomes continuous data on read-out. Moreover, the multiplexer 104 is also configured for supplying to the encoder 102 the information on the residual volume of the buffer memory (total storage capacity less the stored volume of the encoded data), while the encoder 102 is configured for setting a parameter governing the volume of encoded data, such as the quantization step used for quantizing the data of the original picture) based on the information on the residual amount from the multiplexer 104. This prevents overflow or underflow of the multiplexer 104. For multiplexing, the standard of the MPEG system can be used.

The multiplexed data containing the output encoded data of the multiplexer 104, rendered continuous as described above, is outputted from an output terminal 105 of the encoding unit 110 for recording on the recording medium 120. The recorded data is subsequently reproduced and supplied to an input terminal 131 of the decoding unit 130.

In the decoding unit 130, multiplexed data inputted to the input terminal 131 is sent to a demultiplexer 132 which then separates the encoded data and various control data from the multiplexed data to send the encoded data and the control codes to a decoder 133 and to a control circuit 134, respectively.

The control circuit 134 controls the decider 133 based on the control codes supplied thereto. The decoder 133 decodes the encoded data, under control by the control circuit 134, to generate decoded picture signals. It is noted that the time point at which the encoded data is fed to the decider 133 is not coincident with the time point at which the encoded data is decoded by the decoder 133. Thus, for timing adjustment, the demultiplexer 132 temporarily stores the encoded data in a buffer memory, not shown, and reads out the stored encoded data responsive to the decoding state in the decoder 133 to transmit the read-out data to the decoder 133.

The decoded picture signal, obtained by decoding by the decoder 133, is outputted at an output terminal 135 of the decoding unit 130.

The decoded picture signals, outputted by the decoding unit 130, is subsequently supplied to, for example, a display unit, for display.

With the above-described conventional picture display system, a recording medium 120, purchased overseas, having recorded thereon picture signals, such as a motion picture, may be brought to Japan for decoding and reproduction by the decoding unit 130 marketed in Japan. The reverse case, of course, is possible.

From this it follows that a recording medium produced somewhere in the world based on the same standard can be decoded and reproduced by a decoding device produced somewhere based on the same standard.

Meanwhile, a copyright holder entertains the desire to delay or suspend sale of a recording medium for a specified territory, even although the recording medium is produced based on the same standard.

For example, there are occasions wherein a recording medium having recorded a motion picture thereon cannot be marketed or possessed in Japan owing to legal ban. However, it may occur that those who traveled abroad purchase such recording medium and carry it unknowingly into Japan. It is noted that the contents of the recordings can be confirmed on the overseas site of purchase on very rare occasions. In such case, the goods may be seized by the customs house to cause loss to the user.

Moreover, if a motion picture is being exhibited on the theater by road show, the promoter may entertain a desire to prohibit a recording medium having recorded thereon the motion picture already sold overseas from being brought to Japan in consideration of possible future profit resulting from the disclosure in Japan of the motion picture.

However, the recording medium, sold in overseas nations, and regularly purchased by a traveler, can hardly be legally prohibited from being moved to another territory or nation.

SUMMARY OF THE INVENTION

It is therefore an object of the present invention to provide a picture display system in which a recording medium produced on the basis of the same standard and sold in a given area can basically be decoded and reproduced by a decoding device of an arbitrary territory and in which the decoding and reproduction of the recording medium in a specified territory is rendered impossible.

It is another object of the present invention to provide a picture display system in which decoding and reproduction of a recording medium is restricted for a pre-set time period and rendered possible after termination of such pre-set time period.

With the picture display system according to the present invention, in decoding encoded data including at least a first territory code from the multiplexed data on a recording medium, the first territory code owned by the decoding apparatus (player) is compared to a second territory code different from the first territory code. If the first territory code coincides with the second territory code or the first territory code includes the second territory code, the encoded data is decoded and reproduced.

That is, according to the present invention, the multiplexed data is comprised of encoded data multiplexed with the first territory code, as a control code, that can be separated and decoded. For decoding the encoded data of the multiplexed data, the second territory code owned by the decoding apparatus is compared to the first territory code. If the second territory code coincides with the first territory code, decoding and reproduction of the encoded data is allowed.

With the picture display system according to the present invention, in decoding encoded data, containing at least the first territory code and the allowable period data from the multiplexed data, the first territory code is compared to the second territory code generated separately from the first territory code, at the same time as the allowed periods is compared to the absolute time. If the first territory code includes the second territory code, and the absolute time is within the allowed period, the encoded data is decoded and reproduced.

That is, according to the present invention, the multiplexed data is comprised of encoded data multiplexed with the first territory code, that can be separated and decoded, and allowed period data, as control codes. For decoding the encoded data of the multiplexed data, a separately generated second territory code is compared to the first territory code, at the same time as the absolute time is compared to the allowed period. If the second territory code coincides with the first territory code, and the absolute time is within the allowed period, decoding and reproduction of the encoded data is allowed.

DESCRIPTION OF THE PREFERRED EMBODIMENTS

Figure 2:
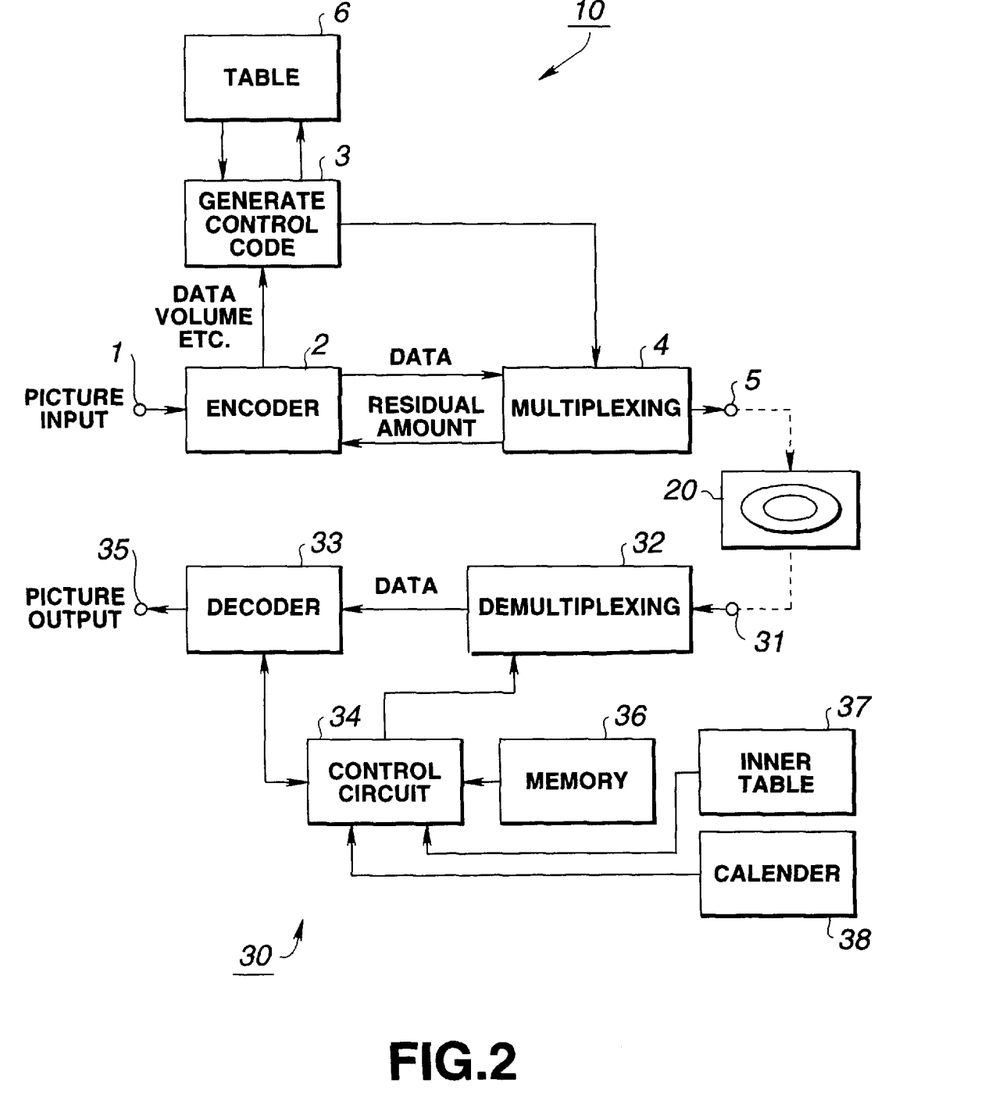
FIG. 2 is an overall block circuit diagram showing an illustrative structure including a player embodying the present invention.

Referring to the drawings, preferred embodiments of the present invention will be explained in detail. FIG. 2 shows an embodiment of an encoding/decoding system applied to a picture display system according to the present invention.

In the encoding/decoding system of the illustrated embodiment of the present invention, the first territory code specifying, for example, a country, and which can be separated or decoded as a control code, is multiplexed along with the inherent data (encoded data) on multiplexed data recorded on the recording medium 20. On a decoding unit (player) 30 is set a second territory code specifying the territory in which the decoding unit 30 is marketed. The decoding unit 30 separates or decodes the separable or decodable first territory code specifying the country, from the multiplexed data from the recording medium 20. The separated or decoded code is termed the decoded territory code. The decoding unit 30 also compares the decoded territory code to the second territory code specifying the sale territory. The second territory code specifying the sale territory is termed the inner territory code. If the inner territory code is included in the decoded territory code, that is if the inner territory code coincides with the decoded territory code, the decoding unit 30 decodes and reproduces the encoded data.

In addition, in the encoding/decoding system of the illustrated embodiment of the present invention, the first territory code specifying, for example, the country, that can be separated or decoded as a control code, and data specifying the allowed decoding period, are multiplexed in the multiplexed data recorded on the recording medium 20. In the decoding unit 30, there are stored the information on the territory code for the territory in which the decoding unit 30 is marketed (the above-mentioned inner territory code) and the calendar. The decoding unit 30 separates or decodes, from the multiplexed data from the recording medium 20, the separable or decodable first territory code specifying the country and the allowed period, that is acquires the decoded territory code and the decoded allowed period data, and compares the decoded territory code to the second territory code specifying the sale territory (inner territory code), while comparing the date specified by the stored calendar and the separated or decoded allowed period data. If the inner territory code is included in the decoded territory code, and the calendar date is within the allowed period, the decoding unit proceeds to decoding and reproduction of the encoded data. The structure of FIG. 2 is hereinafter explained.

To an input terminal 1 of the encoding unit 10 is supplied a continuous picture signal (moving pictures on the time axis) as an input picture signal. This input picture signal is first encoded by the encoder 2 and thence supplied as encoded data to a multiplexer 4.

The encoder 2 takes the difference of the frame-to-frame difference or executes discrete cosine transform (DCT) for eliminating the redundant portions in time and space from the original picture signal (input picture signal) and encodes the resulting signal.

The encoder 2 executes the encoding in accordance with the so-called MPEG (Moving Picture Experts Group) standard, as an example of the encoding. Thus, a unit of the data sequentially outputted by the encoder 2 (encoded data), or unit data, corresponds to the signal of a sole original picture (one-frame or one-field signals) encoded in accordance with the MPEG standard, or a set of encoded moving picture signals under the MPEG standard, or a group-of-pictures (GOP). How the unit data is processed is determined depending on the capacity of a buffer memory, not shown, provided in a multiplexer 4 as later explained and on the data volume of the encoded data.

The encoder 2 also outputs the information specifying the volume of the encoded output data and the other information which are sent to the control code generator 3.

The control code generator 3 generates various flags prescribed under the MPEG standard and various control codes pertinent to the encoded data. The control code generator 3 also reads out program data and the table information of various sorts and sends the various control codes, program data and the table information of various sorts to the multiplexer 4. The control codes may be enumerated by various flags, various headers or the time stamp information, if the encoder 2 is in keeping with the above-mentioned MPEG standard.

The program data is data for executing a playback control program known in general as playback control and constitutes a portion of the program required for the decoding unit 30 to perform the decoding operation. The program data will be explained in detail subsequently.

The information storage unit 6 also has stored therein the separable or decodable first territory code, as part of the above-mentioned control code, specifying the country, and the allowed period data, specifying the allowed decoding period, in addition to the program data and the table information of various sorts, as described above. The control code generator 3 also reads out the territory code and the allowed period data from the information storage unit 6 to supply the read-out data to the multiplexer 4. Thus, in the present embodiment, the control code is determined by the control code generator 3 based on the information from the information storage unit 6 as described above. Meanwhile, the territory code and the allowed period are determined by the copyright owner.

The multiplexer 4 multiplexes the encoded data from the encoder 2 with the control code from the control code generator 3. The resulting multiplexed encoded data and control code are sequentially written from the control code position in the inner buffer memory, not shown. It is the multiplexed data read out from the buffer memory that is outputted.

The multiplexer 4 also maintains continuity of output data as in FIG. 1 described above. That is, since continuity is not assured of the encoded data outputted from the upstream side encoder 2, as described above, the multiplexer 4 temporarily stores the data in the buffer memory and outputs the stored memory on read-out as continuous data. The multiplexer 4 is also configured for suppling the information on the residual amount of the buffer memory ((total storage capacity less the stored volume of the encoded data), while the encoder 2 is configured for setting a parameter governing the volume of encoded data, such as the quantization step used for quantizing the data of the original picture, based on the information on the residual amount from the multiplexer 4. This prevents overflow or underflow of the multiplexer 4.

The multiplexed data containing the output encoded data of the multiplexer 4, rendered continuous as described above, is outputted from an output terminal 5 of the encoding unit 10 for recording on the recording medium 20. The recorded data is subsequently reproduced and supplied to an input terminal 31 of the decoding unit 30. If the multiplexed data is recorded on the recording medium 20, the multiplexed data is reproduced from the recording medium 20 by a reproducing apparatus, not shown, and entered to the decoding unit 30.

The recording medium 20 may be a disc-shaped recording medium capable of recording picture signals, such as a video CD (compact disc) or other video discs, such as DVD (digital video discs), or a memory card having a semiconductor memory.

Figure 3A:
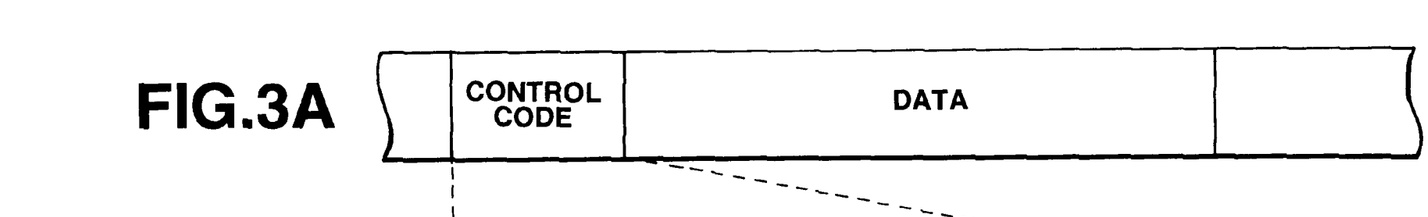
FIGS. 3A and 3B illustrate examples of multiplexed data according to the present invention.
Figure 3B:
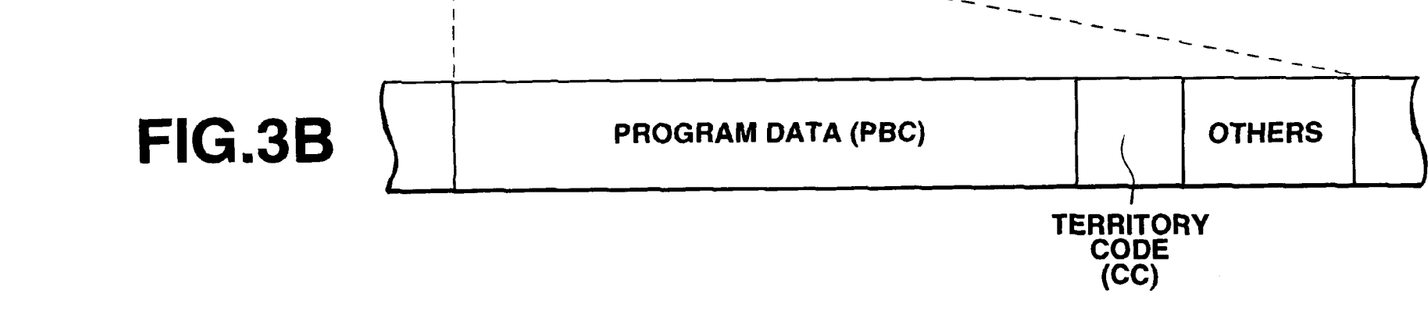

The multiplexed data is made up of a control code portion and a data portion, as shown in FIGS. 3A and 3B. The control code portion is located at a site read out temporally before the data portion. If the multiplexed data is recorded on the CD (compact disc), the control code portion corresponds to the TOC (table-of-contents). More specifically, the control code portion is made up of a program data portion (PBC), territory code portion (CC) and other data.

The decoding unit 30, supplied with the above-described multiplexed data, sends the multiplexed data to a demultiplexer 32. The demultiplexer 32 separates the encoded data and the control code including the program data from the multiplexed data, under control by the control circuit 34 as described above, and sends the encoded data to the decoder 33, while sending the control code including the program data to a memory 36. The data supplied to the memory 36, such as the control code, is further sent to the control circuit 34.

The control circuit 34 has enclosed therein a central processing unit (CPU), not shown, and a read-only memory (ROM), not shown, having written therein the basic operational program, and is configured for performing a complicated operation based on the combination of the basic operational program written in the ROM and the program stored in the memory 36.

The control circuit 34 first reads out the program data among the data stored in the memory 36. The program data stored in the memory 36 is the program data sent from the encoding unit 10. In the present embodiment, the program data is that used for determining the playback control and condition for decodability. The control circuit 34 starts decoding and reproduction of the decoding unit 30 responsive to the program data read out from the memory 36.

The control circuit 34 reads out the control code, among the data stored in the memory 36, based on the program data read out from the memory 36, while also reading out the inner territory code stored in a storage unit 37 for specifying the sale territory of the decoding unit 30, from the storage unit 37. The control circuit 34 also seizes absolute time data, such as date data, from an inner calendar generator 38, for comparing the contents of the control code to the inner territory data and to the absolute time data. That is, at least the above-mentioned territory code (decoded territory code) and the allowed period data of the encoding unit 10 is stated in the control code read out from the memory 36. The control circuit 34 compares the decoded territory code of the encoding unit 10 to the inner territory code of the decoding unit 30, while comparing the allowed period data to the absolute time data.

The control circuit 34, comparing the codes or data as described above, performs control for causing the encoded data to be outputted from the demultiplexer 32 to the decoder 33 if the decoded territory code of the encoding unit 10 includes the inner territory code of the decoding unit 30 and the absolute time is within the allowed period. If otherwise, the control unit 34 performs control for not causing the encoded data to be outputted from the demultiplexer 32 to the decoder 33.

The decoder 33 decodes the encoded data supplied from the demultiplexer 32, under control by the control circuit 34, for generating decoded picture signals (signals corresponding to the original signals).

Thus the decoding unit 30 of the present embodiment judges allowability of reproduction of the encoded data reproduced from the recording medium 20, that is the allowability of decoding and reproduction of the encoded data by the decoder 33, based on the results of comparison of the territory code of the encoding unit 10 supplied from the recording medium 20 with the inner territory code of the decoding unit 30 and on the results of comparison of the absolute time and the allowed period.

If the decoding is performed in the decoder 33, the information on the data volume of the encoded data and the other information are obtained and sent to the control circuit 34, which then controls the address of the buffer memory of the demultiplexer 32 based on this information. For example, since the time point at which the encoded data is sent to the decoder 33 is not coincident with the time point at which the encoded data is decoded by the decoder 33, the demultiplexer 32 temporarily stores the encoded data in a buffer memory, not shown, by way of performing timing adjustment. The control circuit 34 is responsive to the information obtained on decoding by the decoder 33 to read out encoded data stored in the buffer memory to supply the read-out data to the decoder 33.

The decoded picture information, obtained on decoding by the decoder 33, is outputted at an output terminal 35 of the decoding unit 30.

The decoded picture signal, outputted by the decoding unit 30, is sent to a display device, such as CRT or a liquid display device, for display.

Figure 4:
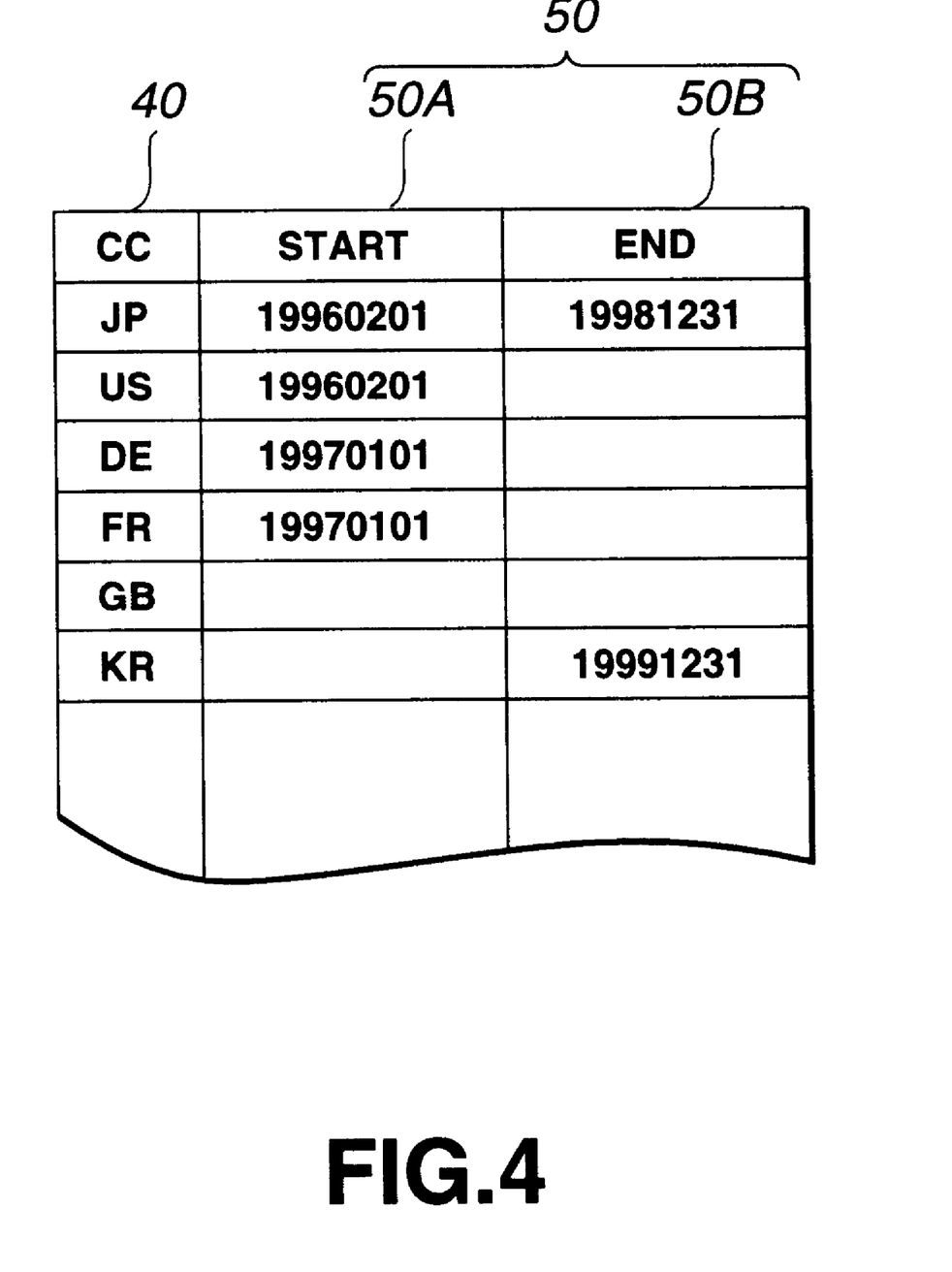
FIG. 4 shows an example of a territory code and an allowed period data employed in the present invention.

Referring to FIG. 4, an illustrative example of the control code, employed in the present embodiment, is explained.

FIG. 4 shows an example of a territory code 40 and an allowed period data 50, generated by the encoding unit 10, among the control codes multiplexed with the encoded data and recorded in this form on the recording medium 20.

The territory code 40 specifies the name or code of a country (CC). In the present embodiment, the territory code is represented by the combination of two alphabetical letters. The numerals used in telephony for representing the country code may also be employed. In the embodiment of FIG. 4, the territory codes of JP, US, DE, FR, GB and KR are used for specifying Japan, United States, Germany, France, England and Korea, respectively.

In the present embodiment, the territory code 40 specifies a country in which the copyright owner or the like is authorized to decode and reproduce encoded data recorded on the recording medium 20. Thus, in the embodiment f FIG. 4, decoding and reproduction is possible only within the above-mentioned six countries. If decoding and reproduction is allowed in all territories or countries, the special codes, such as WO or **, are used as the territory code 40 for discrimination.

The allowed period data 50 of FIG. 3 is made up of an allowed period start data (START) 50A and an allowed period end data (END) 50B. In the embodiment of FIG. 4, the allowed period start data (START) 50A and the allowed period end data (END) 50B are provided for each territory.

Referring to FIG. 4, the allowed period start data 50A and the allowed period end data 50B of the allowed period data 50 for Japan having the territory code of JP are 19960201 and 19981231, for example, meaning that the allowed period starts on Feb. 1, 1996 and ends on Dec. 31, 1998.

Thus, for Japan, decoding and reproduction of the encoded data reproduced from the recording medium 20 are not allowed at any time period other than the period beginning from Feb. 1, 1996 and terminating on Dec. 31, 1998. Therefore, if the recording medium 20 is purchased in another territory, it cannot be decoded or reproduced on a decoding unit sold and used in Japan, except during the above time period.

For United States, whose territory code is US, the allowed period start data 50A is 19960201, but there is no statement of the allowed period end data 50B, meaning that the allowed period starts as from Feb. 1, 1996 and ends at no specified date. Similarly, for Germany and France, whose territory codes are DE and FR, respectively, the allowed period start data 50A is 19970101, but there is no statement of the allowed period end data 50B, meaning that the allowed period starts as from Jan. 1, 1997 and ends at no specified date. Therefore, in the United States, Germany and France, the decoding and reproduction of encoded data reproduced from the recording medium 20 is not allowed before the start date of the allowed period, such that, if the recording medium 20 is purchased in another territory, such as in Japan, it cannot be decoded or reproduced on a decoding unit purchased in the above territories.

For England whose territory code 40 is GB, there is no statement on the allowed period start data 50A nor the allowed period end data 50B, meaning that, no matter when the recording medium 20 is purchased, it can be decoded or reproduced on the decoding unit purchased in the territory, that is in England.

For Korea, whose territory code is KR, there is no statement of the allowed period start data 50A, while the allowed period end data 50B is 19991231, meaning that decoding or reproduction is allowed up to Dec. 31, 1999. Therefore, in the case of Korea, the encoded data reproduced from the recording medium 20 can be decoded and reproduced before the end of the allowed period, but cannot be decoded or reproduced after the end of the allowed period, such that, if the recording medium 20 is purchased in another territory, it cannot be reproduced on the decoding unit purchased in Korea.

The recording medium 20 sold to an individual, it is unnecessary to specify the allowed period end time as in the case of Japan or Korea. However, for a recording medium used for profession, such as for rental, it is necessary to specify the end time for preventing re-sale. That is, a rental store sometimes provides a lease period by negotiation with the copyright owner.

Heretofore, the recording medium used for profession, for which the allowed period has come to a close, is re-sold as second-hand goods, such that it cannot be distinguished from a personally purchased recording medium. The result is that the pricing of second-hand goods was lowered such that it was difficult to sell the new recording medium of the same contents at a fixed pricing.

Conversely, with the illustrated embodiment, the recording medium used for rental as described above cannot be decoded or reproduced after the end of the allowed period, such that it loses its commercial value. Thus it becomes possible to maintain the value of the recording medium owned by a person and to prevent unfair transaction of second-hand goods.

Figure 5:
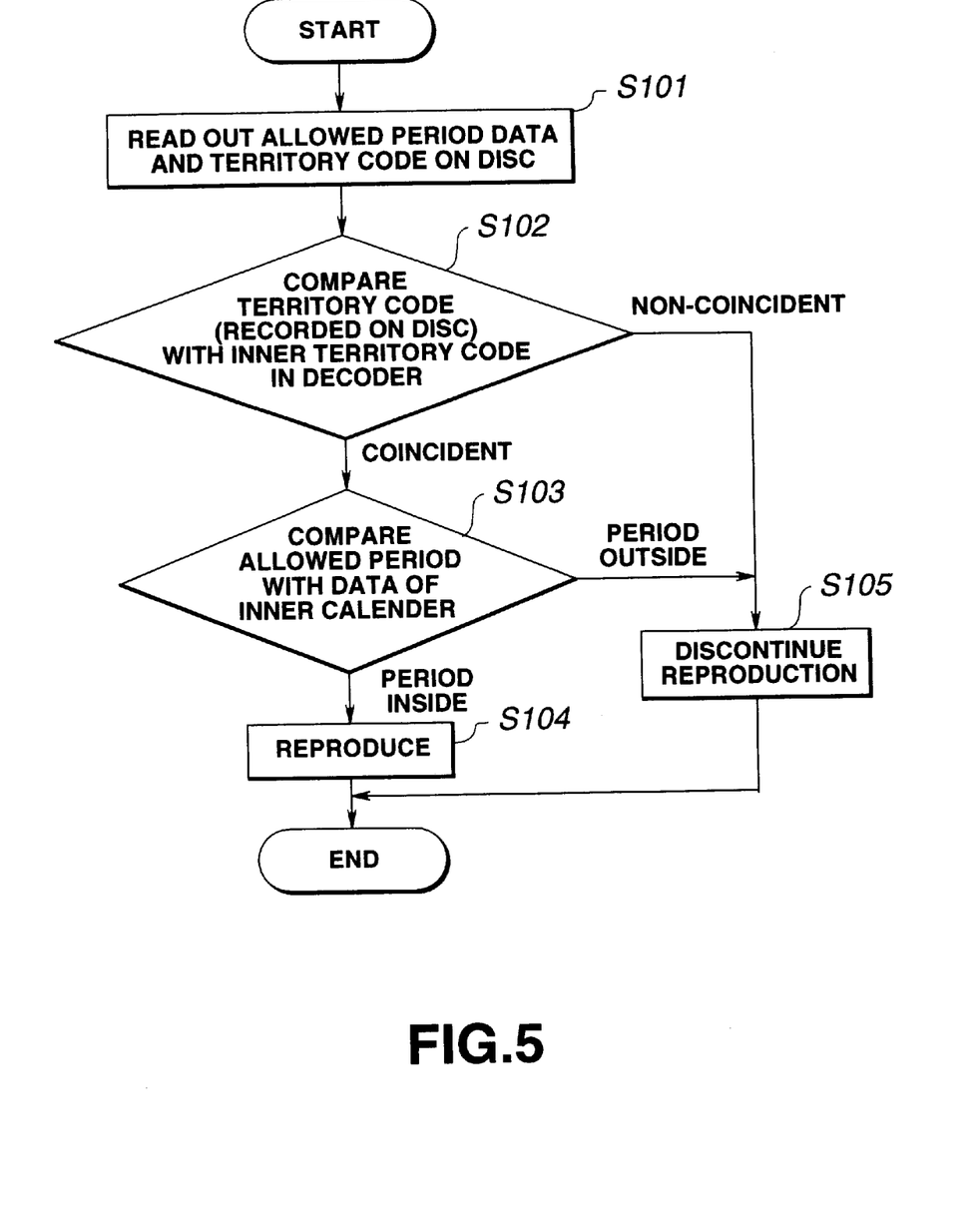
FIG. 5 is a flowchart used in judging the possible reproduction allowability.

Referring to the flowchart of FIG. 5, the processing flow in judging the allowability of reproduction and decoding in the control circuit 33 of the decoding unit 30 of FIG. 2 based on the control code as shown in FIG. 4 is now explained. Meanwhile, the flowchart of FIG. 5 is carried out by the control circuit 33 in accordance with the above-mentioned program data. Therefore, the flowchart can be modified by modifying the program data. The example of FIG. 5 shows the flow in case of using the recording medium 20.

At step S101 of FIG. 5, the allowed period data and the territory code recorded on a disc as typical of the recording medium 20 (the territory code of the encoding unit 10 in the present embodiment) are separated from the multiplexed data reproduced from the disc. If the territory code has been encoded, the encoded territory code is decoded. At the next step S102, the territory code stored in the information storage unit 37 of the decoding unit 30 (inner territory code of the deciding unit in the present embodiment) is compared to the territory code from the disc (the decoded territory code in the present embodiment).

If, at this step S102, the territory code of the information storage unit 37 (inner territory code of the decoding unit) is not included in the territory code on the disc (territory code of the encoding unit), the disc is judged to be a disc not authorized to be reproduced and reproduction is aborted at step S105. Conversely, if the inner territory code of the decoding unit is included in the territory code recorded on the disc (territory code of the encoding unit), the disc is judged to be authorized for reproduction. Thus, at the next step S103, it is checked whether or not reproduction is allowable.

At the step S103, the allowed period data on the disc is compared to the absolute time, that is date, from the inner calendar generator 38 of the decoding unit 30. If it is found at step S103 that the date from the inner calendar generator 38 is not included in the time period indicated by the allowed period data on the disc, the disc is judged to be not authorized for reproduction and reproduction is aborted at step S105. If it is found at step S103 that the date from the inner calendar generator 38 is included in the time period indicated by the allowed period data on the disc, the disc is judged to be authorized for reproduction. Thus, at step S104, the control circuit 34 causes a decoding command to be sent to the decoder 33 which then reproduces and decodes the encoded data.

In the embodiment of FIG. 4, the allowed period data is included in the control code. It is however possible to use only the territory code, in which case allowability of reproduction a decoding is judged solely by relying upon the territory code. It is also possible for the territory code to specify a broader territory or a narrower territory than a country and to cope with an individual encoding/decoding unit. The allowed period is not limited to dates and may be set to a narrower or broader time period. It is also possible to set plural allowed periods for a sole territory code, such as setting plural sets of allowed period start data and allowed period end data.

It is seen from above that, with the player (picture decoding apparatus) or the recording medium according to the present invention, since the territory code or the allowed period data are included in the control code in the multiplexed data, and the decoding unit 30 judges allowability of reproduction and decoding based on the territory code or the allowed period data, it becomes possible to set the territory and the period for which the reproduction and decoding are feasible. Thus, even although the recording medium is prepared on the bases of the same standard, the desire of the copyright owner to delay or refrain from sale of such recording medium in a specified territory can be met.

On the other hand, if a recording medium having a motion picture or the like recorded thereon cannot be reproduced in a certain country due to legal prohibition, it cannot be reproduced on a reproducing apparatus produced in that country even if the recording medium is brought into that country. Moreover, if a motion picture is exhibited for the first time in a theater in a certain country, by way of road show, the promotor may entertain a desire that, in view of lucrativeness, the motion picture already sold in another country be prevented from being brought into the promotor's country, as described above. Such desire by the promotor may be met without imposing legal restrictions.

With the player or the recording medium according to the present invention, decoding and reproduction of a recording medium is basically possible on any decoding unit sold in a certain territory, no matter in which territory the recording medium is sold, providing that the recording medium is fabricated on the basis of the same standard. Moreover, in a specified territory, the decoding and reproduction of a recording medium can be restricted during a pre-set period such that decoding and reproduction of the recording medium is enabled when the pre-set time period has elapsed. Therefore, in a territory in which the reproduction of a certain recording medium is not allowed, reproduction of the recording medium brought from another territory can be prohibited. In addition, by providing the allowed period data, the allowed reproduction period for the recording medium can be set from one territory to another.

What is claimed is:

1. A player for decoding and displaying encoded moving picture signals from a recording medium on which at least the encoded moving picture signals and a control code are recorded as multiplexed data, comprising:

decoding means for decoding the encoded moving picture signals and the control code from said recording medium and for decoding at least one territory code specifying the decodable territory from said control code;

means in the player for generating an inner territory code specifying a territory where the player is used;

territory code comparator means for comparing the decoded territory code to said inner territory code; and control means for decoding and displaying said encoded moving picture signals when the territory code comparator means judges that the decoded territory code includes said inner territory code, wherein said control code further includes allowed period data;

said decoding means being operable to decode at least one allowed period data from said control code;

said player includes an inner calendar generator for generating the absolute time;

said player further includes allowed period comparator means for comparing the decoded allowed period data to said absolute time; wherein if said territory code comparator means judges that the decoded territory code includes the inner territory code and said allowed period comparator means judges that the absolute time is included within said decoded allowed period data, said encoded moving picture signals are decoded and reproduced.

2. The player as claimed in claim 1 wherein said decoded territory code and said inner territory code are country-specifying codes.

3. The player as claimed in claim 2 wherein said allowed period data is made up of allowed period start data and allowed period end data.

4. The player as claimed in claim 3 wherein said allowed period data is made up of allowed period start data and allowed period end data in association with at least two territories.

5. The player as claimed in claim 1 wherein said multiplexed data further includes program data and wherein said control means performs the decoding and reproduction by exploiting said program data.

* * * * *